United States Patent
Prakash et al.

(10) Patent No.: US 10,182,421 B2
(45) Date of Patent: Jan. 15, 2019

(54) AUTHORIZED SHARED ACCESS CARRIER AGGREGATION WITH SENSING

(71) Applicant: QUALCOMM Incorporated, San Diego, CA (US)

(72) Inventors: Rajat Prakash, San Diego, CA (US); Peter Gaal, San Diego, CA (US); Durga Prasad Malladi, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 330 days.

(21) Appl. No.: 13/906,271

(22) Filed: May 30, 2013

(65) Prior Publication Data

US 2013/0322371 A1 Dec. 5, 2013

Related U.S. Application Data

(60) Provisional application No. 61/654,769, filed on Jun. 1, 2012.

(51) Int. Cl.
*H04L 12/28* (2006.01)
*H04W 72/04* (2009.01)
(Continued)

(52) U.S. Cl.
CPC ............ *H04W 72/04* (2013.01); *H04L 5/001* (2013.01); *H04L 5/0098* (2013.01);
(Continued)

(58) Field of Classification Search
CPC . H04W 16/14; H04W 28/18; H04W 72/0453; H04W 72/042; H04W 72/02;
(Continued)

(56) References Cited

U.S. PATENT DOCUMENTS

2010/0246506 A1 9/2010 Krishnaswamy
2011/0070845 A1 3/2011 Chen et al.
(Continued)

FOREIGN PATENT DOCUMENTS

CN 1778132 A 5/2006
EP 1667480 A1 6/2006
(Continued)

OTHER PUBLICATIONS

Partial International Search Report—PCT/US2013/043649—ISA/EPO—dated Oct. 31, 2013.
(Continued)

*Primary Examiner* — Noel R Beharry
*Assistant Examiner* — Lionel Preval
(74) *Attorney, Agent, or Firm* — Harrity & Harrity, LLP \ Qualcomm

(57) ABSTRACT

A method for managing spectrum resources by a network node in a wireless communication system may include determining an availability of a first channel of a spectrum, and assigning a second channel to a secondary carrier in response to determining that the first channel is available. In the alternative, or in addition, the method may include unassigning the second channel to the secondary carrier in response to determining that the first channel is unavailable. The spectrum may be, or include, Authorized Shared Access (ASA) spectrum. The method may be performed by one or more nodes of a network that is a secondary user of the spectrum. The channel may be deemed unavailable when in use by a primary user of the ASA spectrum. A wireless communication apparatus include a processor coupled to a memory holding instructions for execution by the processor to cause the apparatus to perform operations as described above.

29 Claims, 13 Drawing Sheets

(51) Int. Cl.
  *H04W 72/00* (2009.01)
  *H04L 5/00* (2006.01)
  *H04L 27/00* (2006.01)
  *H04W 74/08* (2009.01)
  *H04W 74/00* (2009.01)
  *H04L 5/14* (2006.01)

(52) U.S. Cl.
  CPC ......... *H04L 27/0006* (2013.01); *H04W 72/00* (2013.01); *H04W 72/0453* (2013.01); *H04W 74/0808* (2013.01); *H04L 5/0035* (2013.01); *H04L 5/0053* (2013.01); *H04L 5/1469* (2013.01); *H04W 74/00* (2013.01)

(58) Field of Classification Search
  CPC ............ H04W 72/0426; H04W 72/082; H04L 5/001; H04L 5/0073; H04L 45/245
  USPC ........ 370/329, 230, 525; 455/62, 450, 552.1
  IPC ................. H04W 72/04, 72/00, 72/0453, 74/00, 74/0808; H04L 5/001, 5/0098, 5/0035, 5/0053, 5/1469
  See application file for complete search history.

(56) References Cited

U.S. PATENT DOCUMENTS

| | | | |
|---|---|---|---|
| 2011/0237183 A1* | 9/2011 | Sachs | H04W 28/20 455/26.1 |
| 2011/0319129 A1* | 12/2011 | Bhat | H04W 72/02 455/552.1 |
| 2012/0257588 A1 | 10/2012 | Umeda et al. | |
| 2012/0264440 A1* | 10/2012 | Koskela et al. | 455/450 |
| 2013/0010687 A1 | 1/2013 | Gaal et al. | |
| 2013/0035124 A1 | 2/2013 | Schmidt et al. | |
| 2013/0078924 A1* | 3/2013 | Choudhury et al. | 455/62 |
| 2013/0208587 A1* | 8/2013 | Bala et al. | 370/230 |
| 2014/0044000 A1* | 2/2014 | Charbit | H04W 24/08 370/252 |
| 2015/0043471 A1* | 2/2015 | Rinne et al. | 370/329 |
| 2015/0139175 A1* | 5/2015 | Ratasuk | H04L 5/0051 370/330 |
| 2016/0157233 A1* | 6/2016 | Bai | H04L 5/001 370/329 |
| 2016/0165596 A1* | 6/2016 | Touag | H04W 16/14 455/450 |
| 2016/0249333 A1* | 8/2016 | Freda | H04W 72/042 |
| 2017/0181131 A1* | 6/2017 | Ahmadi | H04W 72/04 |
| 2017/0289997 A1* | 10/2017 | Touag | H04W 16/14 |

FOREIGN PATENT DOCUMENTS

| | | |
|---|---|---|
| EP | 2384074 A1 | 11/2011 |
| GB | 2477649 A | 8/2011 |
| WO | 2013087835 A1 | 6/2013 |

OTHER PUBLICATIONS

International Search Report and Written Opinion—PCT/US2013/043649—ISA/EPO—dated Dec. 13, 2013.

Osa V., et al., "Implementing opportunistic spectrum access in LTE-advanced", EURASIP Journal on Wireless Communications and Networking 2012, pp. 1-17.

Osseiran A., et al., "Mobile and Wireless Communications for IMT-Advanced and Beyond", Aug. 2011, pp. 43-61.

\* cited by examiner

AUTHORIZED SHARED ACCESS CARRIER AGGREGATION WITH SENSING

CROSS REFERENCE TO RELATED APPLICATION

This application claims priority pursuant to 35 U.S.C. § 119(e) to U.S. provisional application Ser. No. 61/654,769 filed Jun. 1, 2012, which is hereby incorporated by reference, in its entirety.

FIELD

This application is directed generally to wireless communications systems. More particularly, but not exclusively, the application relates to systems and apparatus for authorized shared access to wireless spectrum by different wireless communications systems.

BACKGROUND

Wireless communication systems are widely deployed to provide various types of communication content such as voice, data, video, and the like, and deployments are likely to increase with introduction of new data oriented systems such as Long Term Evolution (LTE) systems. Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and other orthogonal frequency division multiple access (OFDMA) systems.

Generally, a wireless multiple-access communication system can simultaneously support communication for multiple wireless terminals (also known as user equipments (UEs), user terminals, or access terminals (ATs)). Each terminal communicates with one or more base stations (also known as access points (APs), EnodeBs, or eNBs) via transmissions on forward and reverse links. The forward link (also referred to as a downlink or DL) refers to the communication link from the base stations to the terminals, and the reverse link (also referred to as an uplink or UL) refers to the communication link from the terminals to the base stations. These communication links may be established via single-in-single-out, single-in-multiple out, multiple-in-single-out, or multiple-in-multiple-out (MIMO) systems.

Newer multiple access systems, for example, LTE, deliver faster data throughput than older technologies. Faster downlink rates, in turn, have sparked a greater demand for higher-bandwidth content, such as high-resolution graphics and video, for use on or with mobile devices. Therefore, demand for bandwidth on wireless communications systems continues to increase despite availability of higher data throughput over wireless interfaces, and this trend is likely to continue. However, wireless spectrum is a limited and regulated resource. Therefore, new approaches are needed in wireless communications to more fully utilize this limited resource and satisfy consumer demand.

SUMMARY

Methods, apparatus and systems for authorized shared access carrier aggregation using channel sensing to manage spectrum resources are described in detail in the detailed description, and certain aspects are summarized below. This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In certain embodiments, a method by a network node for managing spectrum resources in a wireless communication system may include determining an availability of a first channel of a spectrum. The method may include at least one of: i) assigning a second channel to a component carrier in response to determining that the first channel is available, or ii) unassigning (e.g., releasing or not assigning) the second channel to the component carrier in response to determining that the first channel is unavailable. As used herein, "network entity" or "network node" excludes mobile entities, user equipment (UEs) and other access terminals, unless specifically indicated otherwise. A "component carrier" may include a secondary carrier or other carrier. A "carrier" refers to a physical carrier (e.g., a definite band or portion of a wireless spectrum) and is distinct from a "channel." As used herein, a "channel" refers to a defined subdivision of a signal transmitted over a carrier; a carrier may be used to transmit multiple channels. Channels may often be designated for signaling information of specific types (e.g., control signals or data).

Further details regarding selection of the first and second channels are described in the detailed description that follows. The spectrum may be, or may include, an authorized shared access (ASA) spectrum, and the first channel and second channel may be ASA channels. The first channel and second channel are distinct and separate channels; for example, the first channel may be reserved for uplink by the primary user of the ASA spectrum and the second channel may be reserved for downlink by the primary user, or vice-versa. As in the foregoing example, the first channel and second channel may have a predetermined correlation. For further example, the first channel may be a predetermined channel used for communication by a mobile entity.

In other aspects, the method may further include at least one of: i) activating the component carrier (e.g., secondary carrier) in response to determining that the first channel is available, or ii) deactivating the component carrier in response to determining that the first channel is unavailable. Activating may include, for example, initiating use of component carrier by a secondary user of the ASA spectrum. In such case, the method may include the licensed secondary user transmitting simultaneously on a primary carrier and the component carrier. It should be appreciated that the "licensed secondary user" includes at least one base station, for example, an eNB, femtocell, pico cell, or other access node of the wireless communication system, by which the transmitting is carried out.

Determining the availability of the first channel may include, for example, monitoring the first channel, detecting transmissions on the first channel, or communicating with one or more mobile entities monitoring the first channel. For example, the method may include receiving from a mobile entity an indication of whether a transmission on the first channel was detected, wherein the assigning the second channel is further based on the received indication.

A related method for managing spectrum resources by a network entity in a wireless communication system may likewise include determining an availability of a channel of a spectrum, and at least one of: i) transmitting a message to another network node to initiate carrier aggregation in response to determining that the channel is available, or ii) transmitting a different message to the network node to deactivate carrier aggregation in response to determining that the channel is unavailable. The spectrum and channel characteristics may be the same as described for the first method. The channel may correspond to the first channel in the method described above; for example, the channel may be a first channel of the ASA spectrum different and distinct from a second channel of which the wireless communication system is a secondary user.

In other aspects, the method may include assigning the channel to a secondary carrier, wherein the network node is associated with a primary carrier; for example, the network node may be using a different channel for a primary carrier. The network entity may perform the determining, for example, by detecting a transmission on the channel, or receiving from a mobile entity an indication of whether a transmission was detected, wherein the transmitting a message or transmitting the different message is further based on the received indication.

In related aspects, a wireless communication apparatus may be provided for performing any of the methods and aspects of the methods summarized above. An apparatus may include, for example, a processor coupled to a memory, wherein the memory holds instructions for execution by the processor to cause the apparatus to perform operations as described above. Certain aspects of such apparatus (e.g., hardware aspects) may be exemplified by equipment such a network entity, for example a base station, eNB, picocell, femtocell or Home Node B. Similarly, an article of manufacture may be provided, including a computer-readable storage medium holding encoded instructions, which when executed by a processor, cause a network entity or access terminal to perform the methods and aspects of the methods as summarized above.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, or other technology. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, or other technology. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
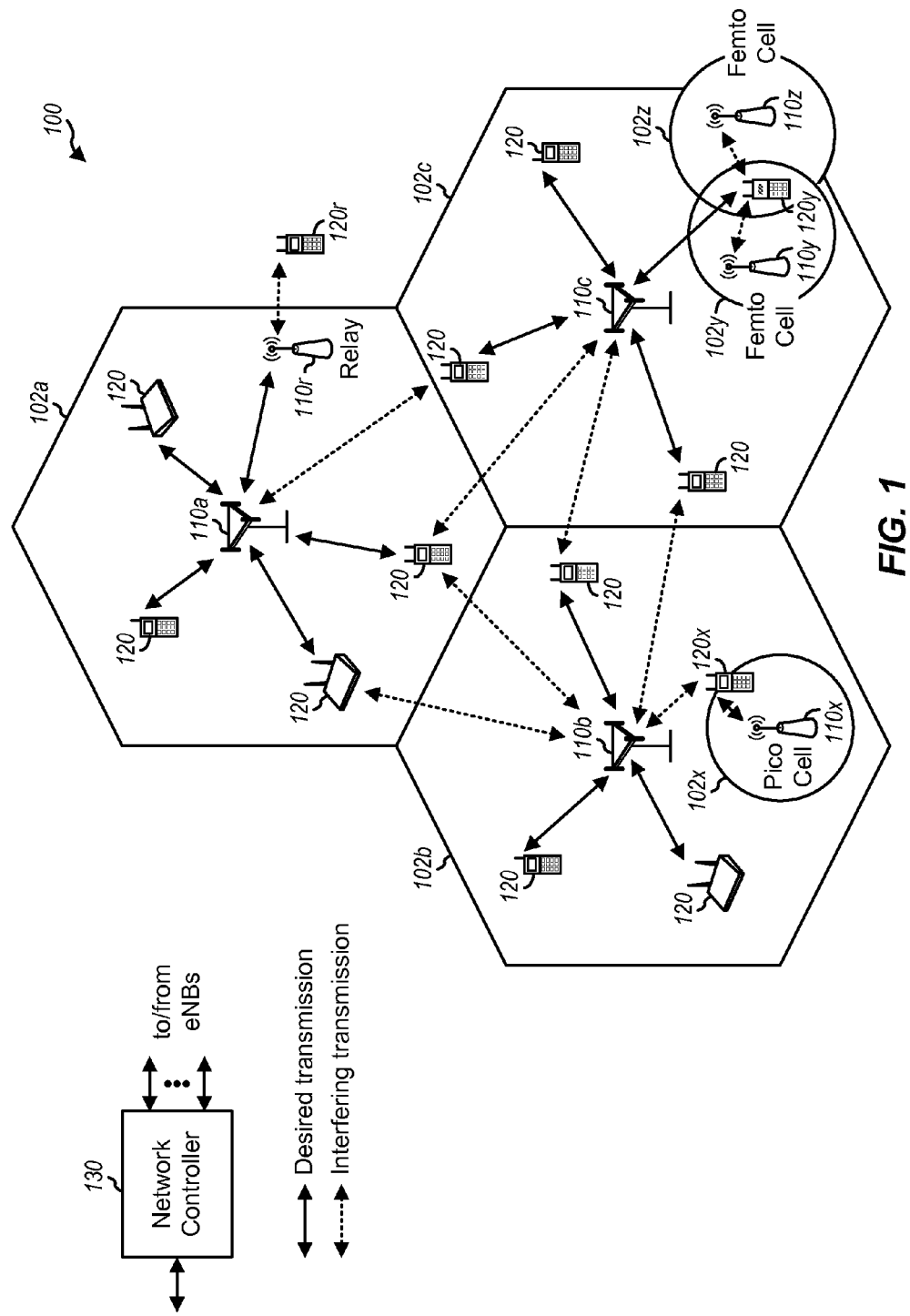
FIG. 1 is a block diagram conceptually illustrating an example of a telecommunications system.

FIG. 1 shows a wireless communication network 100, which may be an LTE network. The wireless network 100 may include a number of eNBs 110 and other network entities. An eNB may be a station that communicates with the UEs and may also be referred to as a base station, a Node B, an access point, or other term. Each eNB 110a, 110b, 110c may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, or other group of UEs). An eNB for a macro cell may be referred to as a macro eNB. An eNB for a pico cell may be referred to as a pico eNB. An eNB for a femto cell may be referred to as a femto eNB or a home eNB (HNB). In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

The wireless network 100 may also include relay stations 110r. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, or other terminology.

The wireless network 100 may be a heterogeneous network that includes eNBs of different types, e.g., macro eNBs, pico eNBs, femto eNBs, relays, or other eNBs. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as an access terminal, a mobile station, a subscriber unit, a station, or other terminology. A UE may be a cellular phone, a personal digital assistant (PDA), a wireless modem, a wireless communication device, a handheld device, a laptop computer, a cordless phone, a wireless local loop (WLL) station, or other mobile entities. A UE may be able to communicate with macro eNBs, pico eNBs, femto eNBs, relays, or other network entities. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or other terminology. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
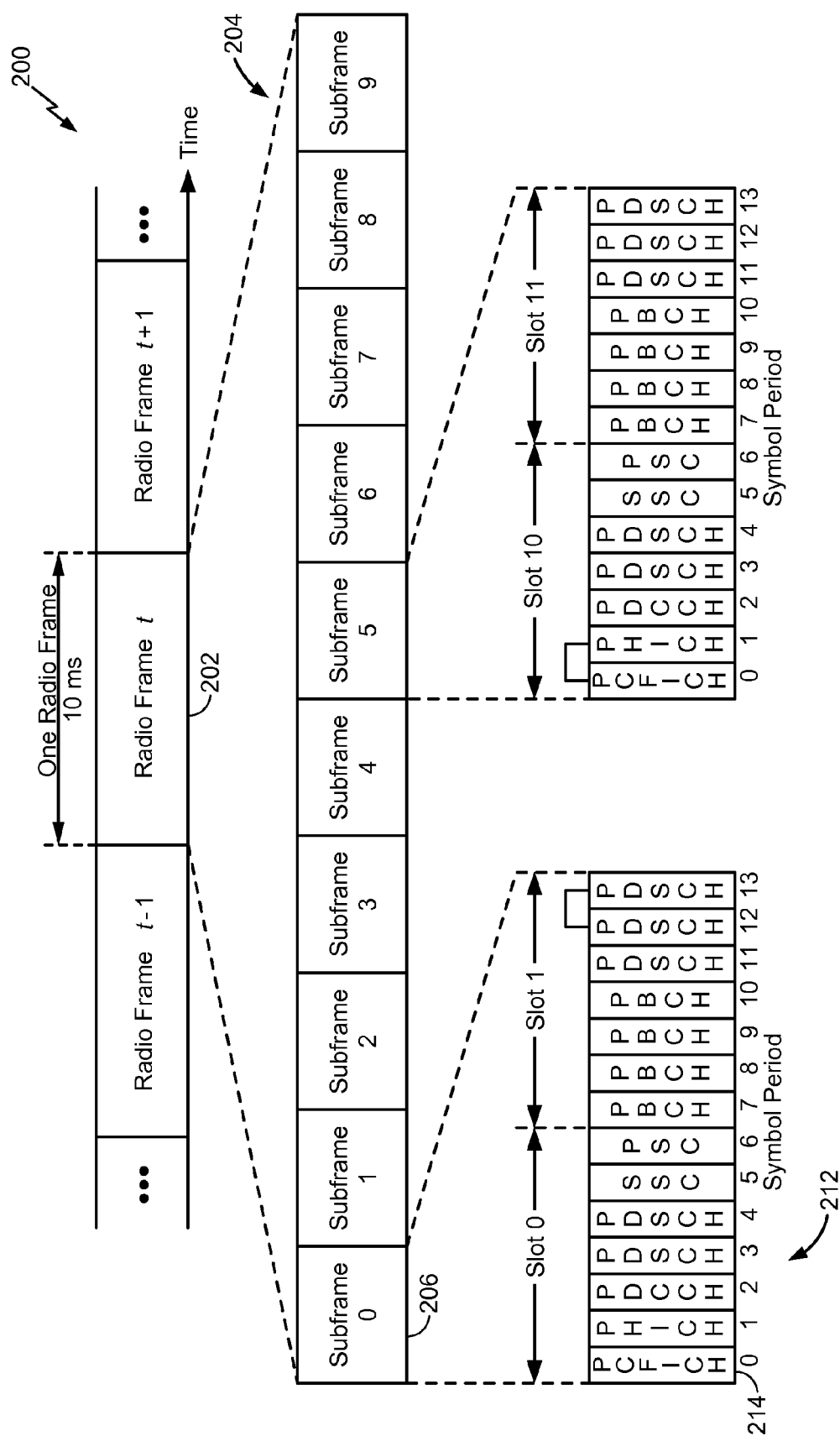
FIG. 2 is a block diagram conceptually illustrating an example of a down link frame structure in a telecommunications system.
Figure 6:
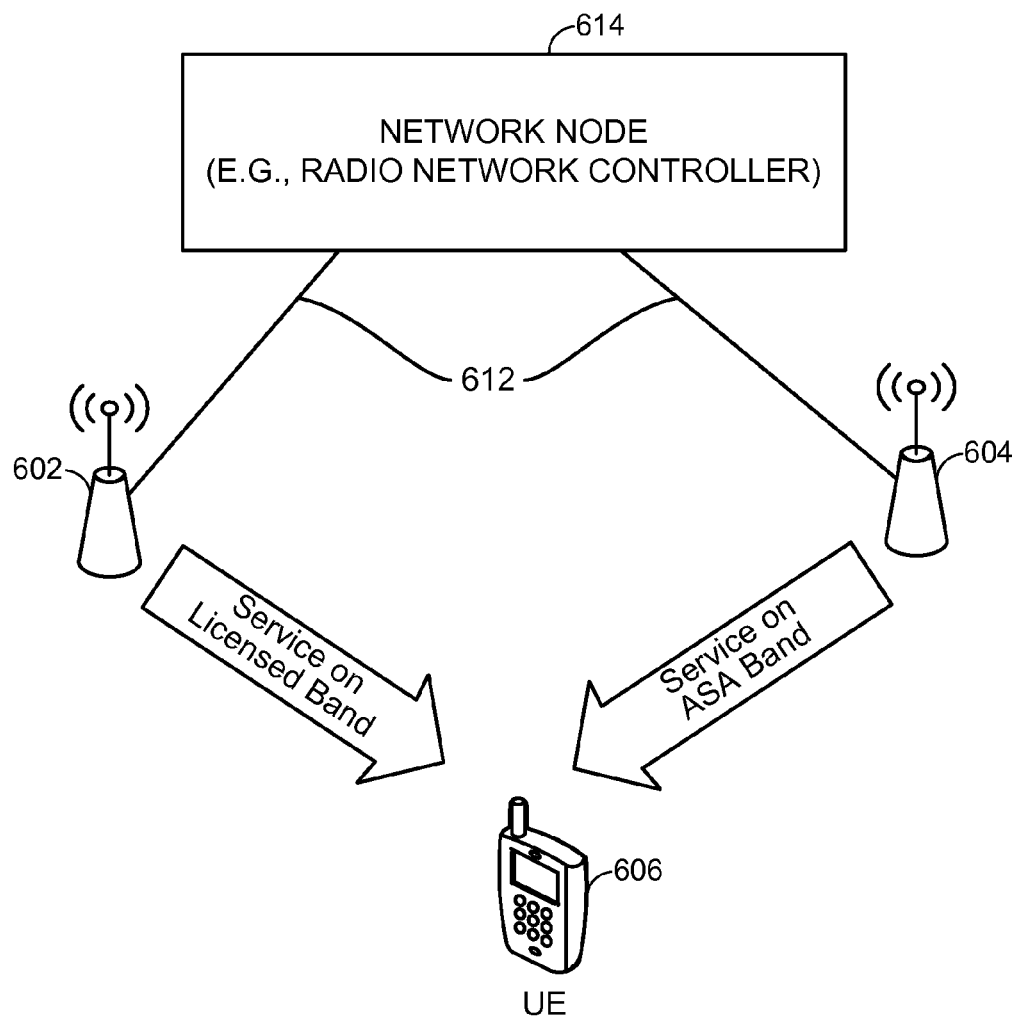
FIG. 6 illustrates an exemplary system implementing flow splitting between two network nodes.

FIG. 2 shows a down link frame structure used in LTE. The transmission timeline for the downlink may be partitioned into units of radio frames 200. Each radio frame, for example, frame 202, may have a predetermined duration (e.g., 10 milliseconds (ms)) and may be partitioned into 10 subframes 204 with indices of 0 through 9. Each subframe, for example 'Subframe 0' 206, may include two slots, for example, 'Slot 0' 208 and 'Slot 1' 210. Each radio frame may thus include 20 slots with indices of 0 through 19. Each slot may include 'L' symbol periods, e.g., 7 symbol periods 212 for a normal cyclic prefix (CP), as shown in FIG. 2, or 6 symbol periods for an extended cyclic prefix. The normal CP and extended CP may be referred to herein as different CP types. The 2L symbol periods in each subframe may be assigned indices of 0 through 2L−1. The available time frequency resources may be partitioned into resource blocks. Each resource block may cover 'N' subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in only a portion of the first symbol period of each subframe, although depicted in the entire first symbol period 214 in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical H-ARQ Indicator Channel (PHICH) and a Physical Downlink Control Channel (PDCCH) in the first M symbol periods of each subframe (M=3 in FIG. 2). The PHICH may carry information to support hybrid automatic retransmission (H-ARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), or other criteria.

Figure 3:
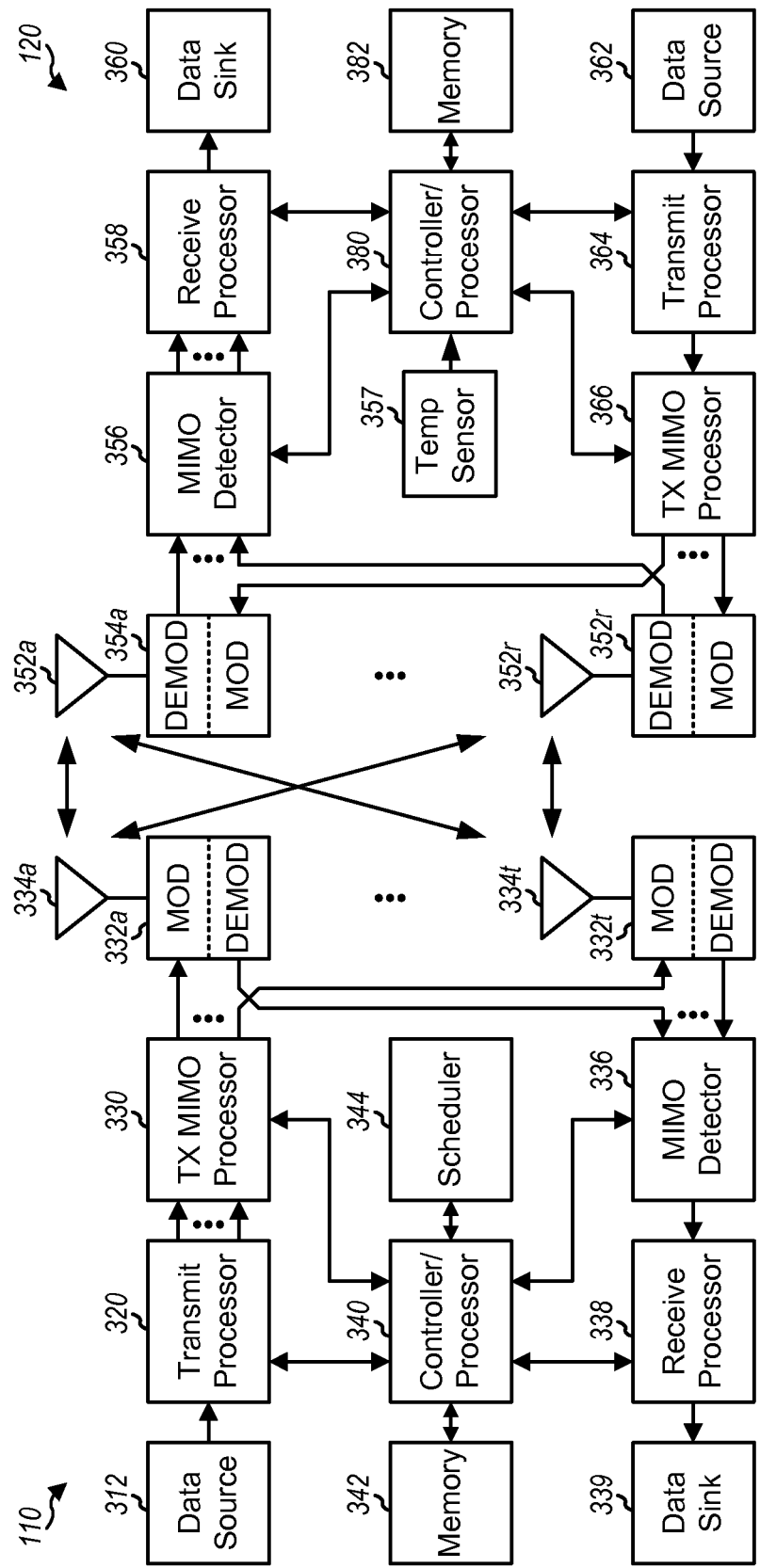
FIG. 3 is a block diagram conceptually illustrating is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. The base station 110 may also be a base station of some other type. The base station 110 may be equipped with antennas 334*a* through 334*t*, and the UE 120 may be equipped with antennas 352*a* through 352*r*.

At the base station 110, a transmit processor 320 may receive data from a data source 312 and control information from a controller/processor 340. The control information may be for the PBCH, PCFICH, PHICH, PDCCH, or other control channel. The data may be for the PDSCH, or other data channel. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332*a* through 332*t*. Each modulator 332 may process a respective output symbol stream (e.g., for OFDM, or other modulation method) to obtain an output sample stream. Each modulator 332 may further process (e.g., convert to analog, amplify, filter, and upconvert) the output sample stream to obtain a downlink signal. Downlink signals from modulators 332*a* through 332*t* may be transmitted via the antennas 334*a* through 334*t*, respectively.

At the UE 120, the antennas 352*a* through 352*r* may receive the downlink signals from the base station 110 and may provide received signals to the demodulators (DEMODs) 354*a* through 354*r*, respectively. Each demodulator 354 may condition (e.g., filter, amplify, downconvert, and digitize) a respective received signal to obtain input samples. Each demodulator 354 may further process the input samples (e.g., for OFDM, or other modulation method) to obtain received symbols. A MIMO detector 356 may obtain received symbols from all the demodulators 354*a* through 354*r*, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380. The processor 380 may include modules for performing operations of the methods described herein, by executing instructions held in the memory 382. Such modules may include, for example, modules for measuring data quality, sensing resource constraints, and providing control signals in a control channel for transmitting to the eNB 110. In an aspect, the UE 120 may include a temperature sensor 357 (e.g., a thermistor) coupled to the controller for sensing a temperature of one or more hardware components of the processor. Temperature or other resource measurement may be used as input to an algorithm for controlling transmission of data in carrier aggregation, as described in more detail elsewhere herein.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354*a* through 354*r* (e.g., for SC-FDM, or other method), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in FIGS. 4 and 5, and/or other processes for the techniques described herein. The memories 342 and 382 may store data and program codes for the base station 110 and the UE 120, respectively. A scheduler 344 may schedule UEs for data transmission on the downlink and/or uplink.

Carrier Aggregation

LTE-Advanced UEs may use spectrum in 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 Mhz. These asymmetric FDD assignments will conserve spectrum and are a good fit for the typically asymmetric bandwidth utilization by broadband subscribers.

In LTE Rel-10, a UE may be configured with up to 5 component carriers (CC) for (CA). Each CC may use up to 20 MHz and maintain backward compatible. Up to 100 MHz may be configured for a UE. CCs in CA may be either all FDD or TDD. There is no mixture of FDD & TDD in CA. All TDD CCs may have the same DL:UL configuration, although special subframes may be configured separately for different CCs. One CC may be designated as the primary CC (PCC or PCell), which may be the only CC carrying PUCCH and common search space. Other CC(s) may be designated as the secondary CC(s) (SCC or SCell).

In LTE Rel-11, aggregation of TDD of different configurations may be supported, allowing more flexibility in deployment. Each CC may be backward compatible for Rel-8/9/10 in the single carrier mode, although it is also possible to introduce non-backward compatible CCs (e.g., carrier segments, extension carriers). In future releases, aggregation of TDD and FDD may be supported.

Carrier Aggregation Types

Figure 4A:
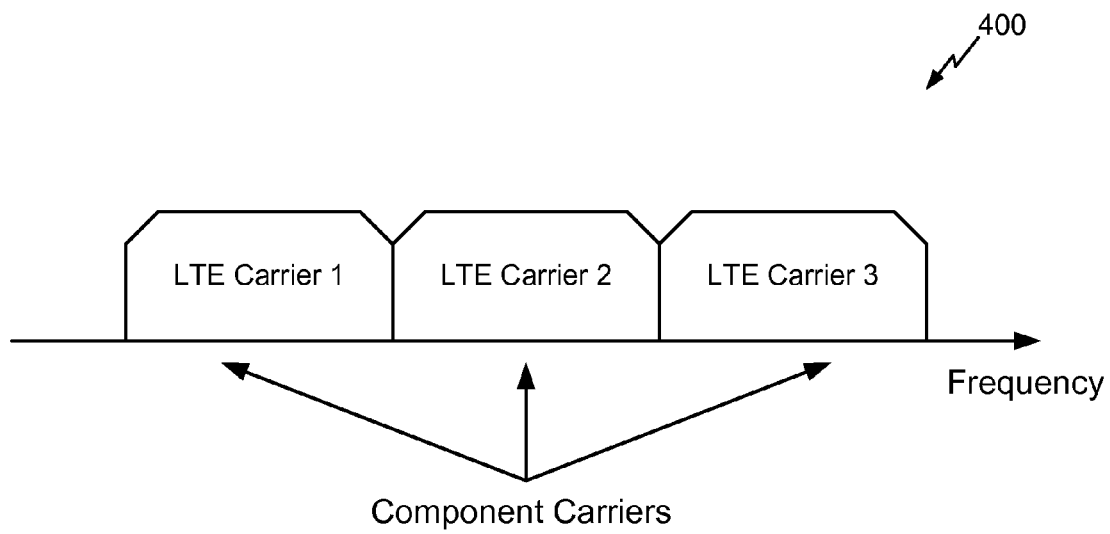
FIG. 4A discloses a contiguous carrier aggregation type.
Figure 4B:
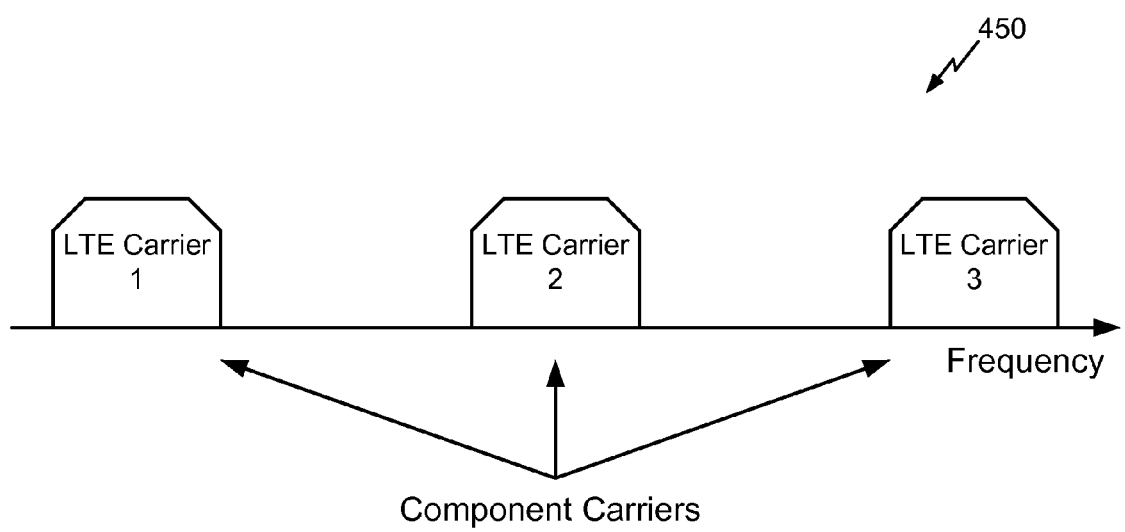
FIG. 4B discloses a non-contiguous carrier aggregation type.

For the LTE-Advanced mobile systems, two types of carrier aggregation (CA) methods have been proposed, contiguous CA and non-contiguous CA. They are illustrated in FIGS. 4A and 4B. Non-contiguous CA 450 refers to configurations wherein multiple available component carriers are separated along the frequency band (FIG. 4B). On the other hand, contiguous CA 400 refers to configurations wherein when multiple available component carriers are adjacent to each other (FIG. 4A). Both non-contiguous and contiguous CA aggregate multiple LTE/component carriers to serve a single unit of LTE Advanced UE.

Multiple RF receiving units and multiple FFTs may be deployed with non-contiguous CA in LTE-Advanced UE since the carriers are separated along the frequency band. Because non-contiguous CA supports data transmissions over multiple separated carriers across a large frequency range, propagation path loss, Doppler shift and other radio channel characteristics may vary a lot at different frequency bands.

Thus, to support broadband data transmission under the non-contiguous CA approach, methods may be used to adaptively adjust coding, modulation and transmission power for different component carriers. For example, in an LTE-Advanced system where the enhanced NodeB (eNB) has fixed transmitting power on each component carrier, the effective coverage or supportable modulation and coding of each component carrier may be different.

Figure 5:
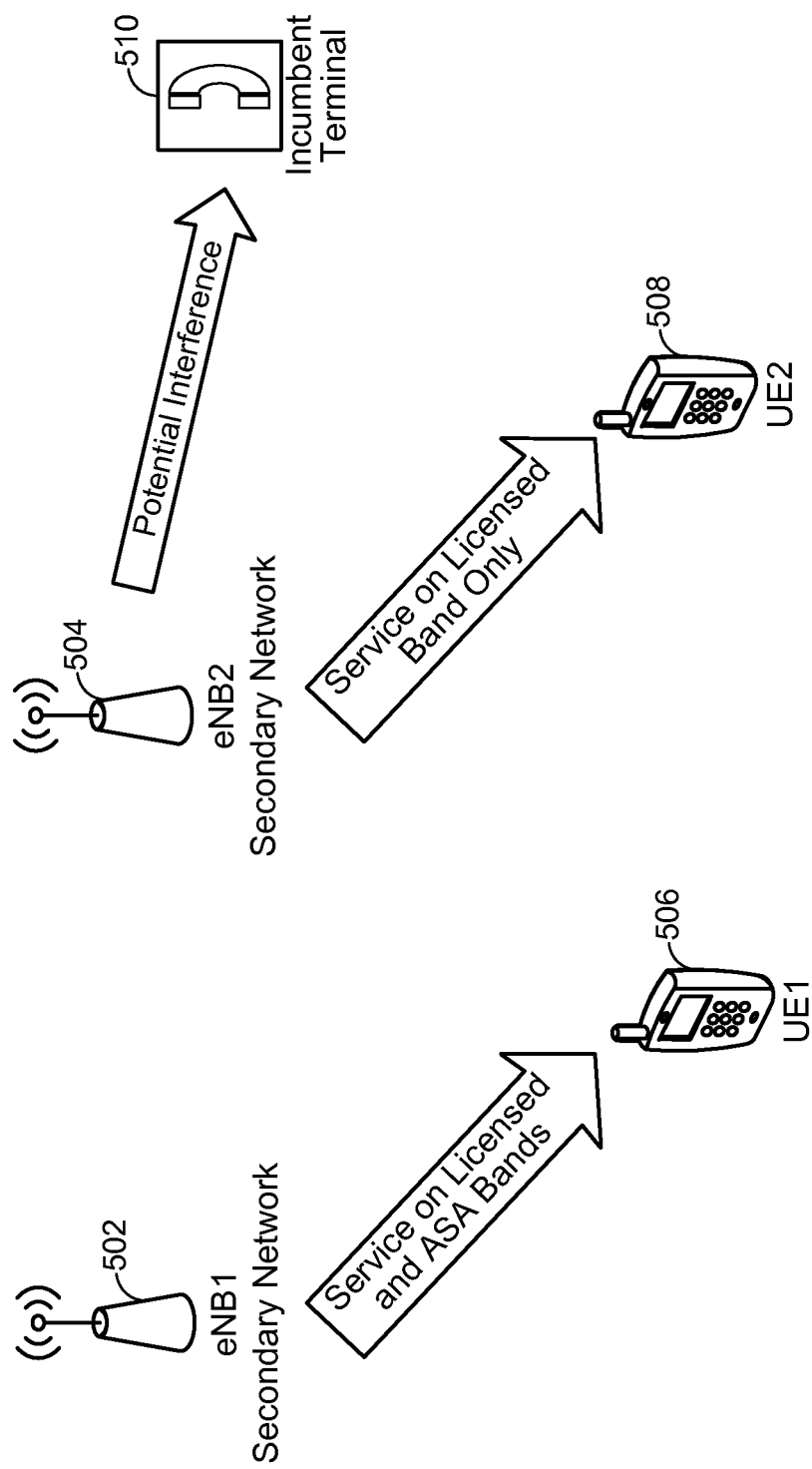
FIG. 5 illustrates an exemplary system implementing authorized shared access (ASA) carrier aggregation (CA) with sensing.

Authorized Shared Access (ASA) Carrier Aggregation (CA) with Sensing Implementation Examples FIG. 5 illustrates an exemplary system implementing ASA CA with sensing. ASA is a spectrum licensing scheme in which portions of spectrum unused by incumbent network(s) (sometimes referred to herein as incumbent system(s) or primary licensee or primary user(s)) are licensed to secondary licensee(s) (sometimes referred to herein as secondary network(s) or secondary system(s) or secondary user(s)) to provide commercial services. Such arrangements may arise when it is economically beneficial to the participants. While portions of the spectrum may be shared between the incumbent network (primary licensee) and secondary network (secondary licensee), it is desirable to minimize negative effects on the incumbent network, where the negative effects may include interference from users of the secondary network. It may also be desirable to maximize the spectrum available to the secondary network. When the time scale of spectrum use by the incumbent system and incumbent UEs is short, it may be difficult to provide stable service on the ASA spectrum to the secondary network. It may be difficult to provide the stable service because the spectrum availability may change too quickly. It may also be difficult to detect localized regions, including time and spatial domains, where the ASA spectrum is not being used by the incumbent system.

Returning to FIG. 5, illustrated are secondary networks 502, 504, UEs 506, 508 of the secondary networks 502, 504, and an incumbent UE 510. Secondary network 502 may be communicatively coupled to UE 506, while secondary network 504 may be communicatively coupled to UE 508.

An aspect for implementing ASA with CA is described herein, illustrating a methodology for using ASA with CA but not limiting the disclosure to the illustrated embodiments.

An eNB of a secondary network (e.g., secondary networks 502, 504) may determine whether the ASA spectrum is available. The determination may be based on sensing the activity of the incumbent system. For example, the sensing may be performed on a frequency that is a candidate for use by the incumbent eNB 510 (e.g., frequency f1). Sensing may also be performed on a frequency that is not intended to be used by the secondary network (e.g., secondary networks 502, 504), but is known to be used by the incumbent system (e.g., frequency f2) which may indicate the availability of frequency f1. The secondary network may choose to sense frequency f2 even if the secondary network only desires to use frequency f1 because frequency f2 gives a hint of whether frequency f1 is used. Frequencies f1 and f2 may be correlated such that usage of frequency f2 is related to usage of frequency f1. This may be the case when frequency f1 is a downlink frequency and frequency f2 is a corresponding uplink frequency. Sensing by the secondary network (e.g., an eNB) may be assisted by a UE, with the UE reporting its sensing result to the secondary eNB.

Carrier aggregation may be used to serve the UE 506, 508 of the secondary system 502, 504, for example, to boost data rates. The component carriers (CC) configured for the UE 506, 508 may include a primary component carrier (PCC) using a licensed carrier, and secondary component carriers (SCC) using the ASA spectrum. In the example of FIG. 5, the ASA spectrum may be available for use by the secondary network 502. Secondary network 502 may use the licensed carrier for the PCC, and the ASA frequency for the SCC. If the secondary network 502 later senses the incumbent UE 510, the secondary network 502 may deactivate the SCC or unassign the ASA spectrum to the SCC (e.g., by setting the SCC to null). Service may continue on the PCC.

Continuing with the example of FIG. 5, for the secondary network 504, the ASA spectrum may not be available (e.g., secondary network 504 senses the presence of the incumbent UE 510). Secondary network 504 may use the licensed carrier for the PCC and set the SCC to null or deactivate the SCC if the SCC is already configured for the ASA frequency. If the secondary network 504 later senses the incumbent UE 510 is no longer present, the secondary network 504 may activate the SCC (if already configured for the ASA frequency), or configure the SCC. Service on both the PCC and SCC may commence. An advantage of the methods described above may include quick reaction to the incumbent UE's 510 activity in terms of providing service on the ASA spectrum or ceasing transmissions on the ASA spectrum.

FIG. 6 illustrates an exemplary system implementing flow splitting between two network nodes. Flow splitting may deliver data simultaneous over two or more network nodes to a UE 606 to increase data rate. Part of the data is transmitted over a first network node, while the rest of the data is transmitted over a second or more network nodes. In one embodiment, part of the data is transmitted via a macrocell, femtocell, or picocell while the rest of the data may be transmitted via a booster cell such as a macrocell, femtocell, or picocell. In another embodiment, the first network node operates on the licensed spectrum while the second network node operates on the ASA spectrum. The first and second network nodes may belong to the same operator or different operators.

In the example illustrated in FIG. 6, a first node 602 configured to operate on the licensed spectrum and a second node 604 configured to operate on the ASA spectrum may communicate through a backhaul 612 via a network node 614 such as a radio network controller. The backhaul 612 may be configured to use an X2 or Iu interface. The second node 604 may sense that the ASA spectrum is available and send a message to the first node 602, operating on the licensed spectrum, causing the first node 602 to initiate a flow splitting mode for transmission of data to the UE 606. The flow splitting mode may include transmitting a portion of the data flow via the first node 602 through the PCC (licensed spectrum), and transmitting a portion of the data flow via the second node 604 through the SCC (ASA spectrum). Additionally, the second node 604 may sense that the ASA spectrum is no longer available and send a message to the first node 602, causing the first node 602 to discontinue the flow splitting mode.

Figure 7:
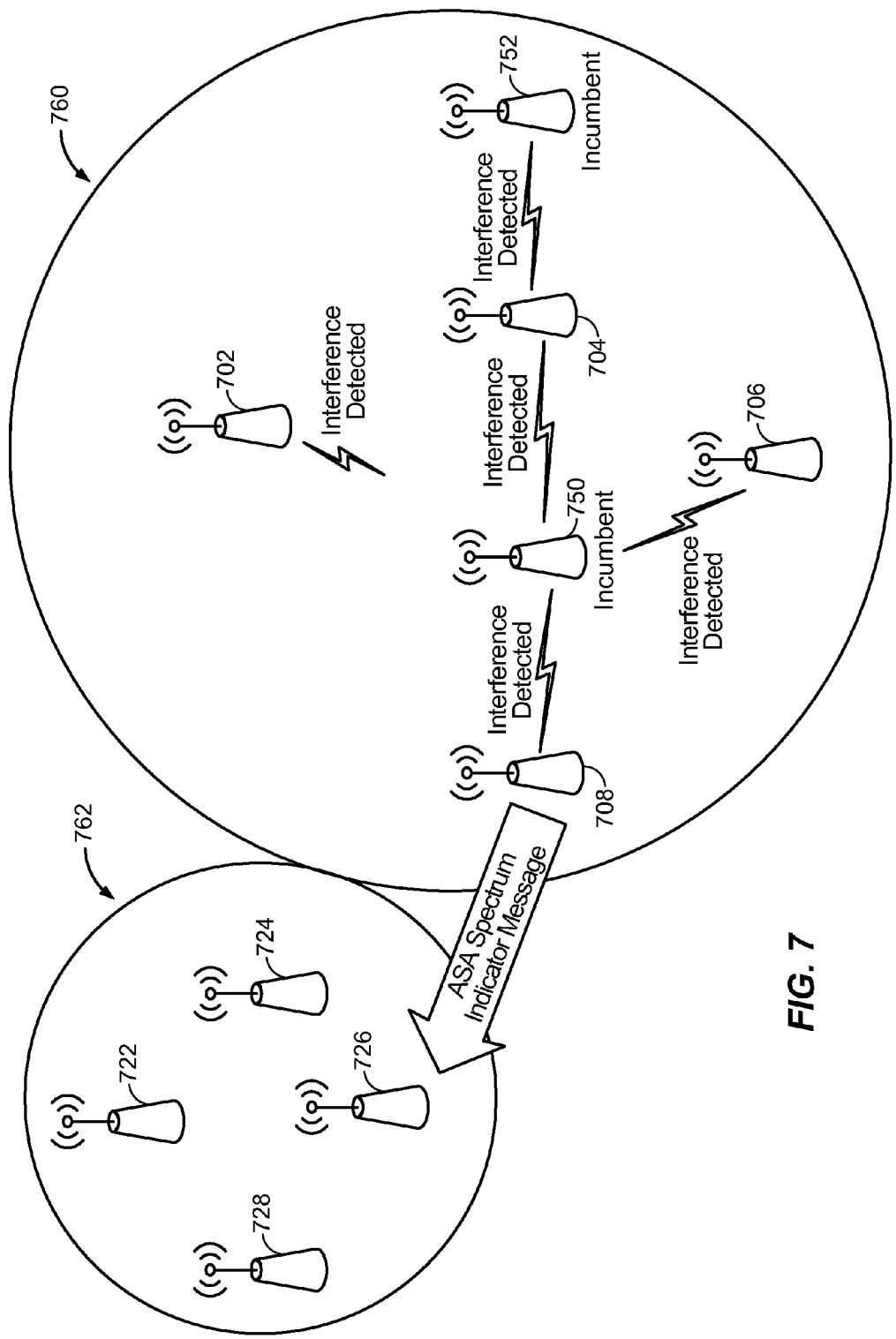
FIG. 7 illustrates exemplary clusters of nodes implementing coordinated sensing.

FIG. 7 illustrates exemplary clusters of nodes implementing coordinated sensing. In sensing-based approaches, a hidden node problem may occur. The hidden node problem occurs when a node is visible to a neighbor node, but not to other nodes in communication with the neighbor node. For example, the node and other nodes may be located at opposite distant sides with respect to the neighbor node. Joint sensing by a cluster of nodes may help mitigate or solve the hidden node problem.

Two clusters of nodes 760, 762 are illustrated in FIG. 7. Cluster 760 includes secondary network nodes 702, 704, 706, and 708. Cluster 762 includes secondary network nodes 722, 724, 726, and 728. The secondary network nodes may communicate over a backhaul protocol such as X2 or Iu. The secondary network nodes may also be connected to an RNC. The cluster grouping is for illustrative purposes only, and the secondary network nodes may be grouped in any combination. Two incumbent nodes 750, 752 are illustrated. The incumbent nodes are not limited to wireless network nodes and may include other transceivers such as radar and police equipment. Incumbent node 750 is located close to all secondary network nodes in the cluster 760, and may be sensed directly by all secondary network nodes in the cluster 760. Incumbent node 752 is located on a far edge by secondary network node 704, and incumbent node 752 may be a hidden node to nodes 702, 706, 708. In this case, coordinated sensing (e.g., through messaging) may reveal incumbent node 752 to nodes 702, 706, 708. When node 704 senses incumbent node 752 using the ASA spectrum, node 704 sends a message to its neighbor nodes 702, 706, 708 indicating that the ASA spectrum is busy. The neighbor nodes 702, 706, 708 receiving the message may discontinue use of the ASA spectrum, or may reduce their transmission power. When the node 704 senses no incumbent node using the ASA spectrum, node 704 may send a message to its neighbor nodes 702, 706, 708 that the ASA spectrum is available. The neighbor nodes 702, 706, 708 receiving the message may begin to use the ASA spectrum (unless the neighbor nodes 702, 706, 708 sense an incumbent node themselves or via other neighbor nodes). The message indicating availability or unavailability of the ASA spectrum may propagate over multiple tiers of neighbors. For example, node 708 may send a message to node 726 indicating the presence of incumbent node 750. Node 708 may propagate the message to nodes 724, 728. More tiers may imply more conservative use of the ASA spectrum, and also lower probability that the incumbent UE faces unacceptable interference. Availability of the ASA spectrum may indicate to a network node to assign or activate an ASA channel to a carrier. Unavailability of the ASA spectrum may indicate to the network node to unassign or deactivate an ASA channel to the carrier.

Coordinated sensing may also be achieved through coordinated multi-point (CoMP) transmission. By coordinating and combining signals from multiple antennas, CoMP may enable the cluster 760 to sense the incumbent nodes 750, 752 even when the incumbent nodes 750, 752 are at a far distance or at cell-edge regions. For example, in FIG. 7, signals from incumbent node 750 may be received by nodes 702, 704, 706, 708. The signals may be coordinated, and sensing of incumbent node 750 may be improved. Exchange of information among the nodes 702, 704, 706, 708 may be communicated via the backhaul protocol.

Example Methodologies and Apparatus

Figure 8:
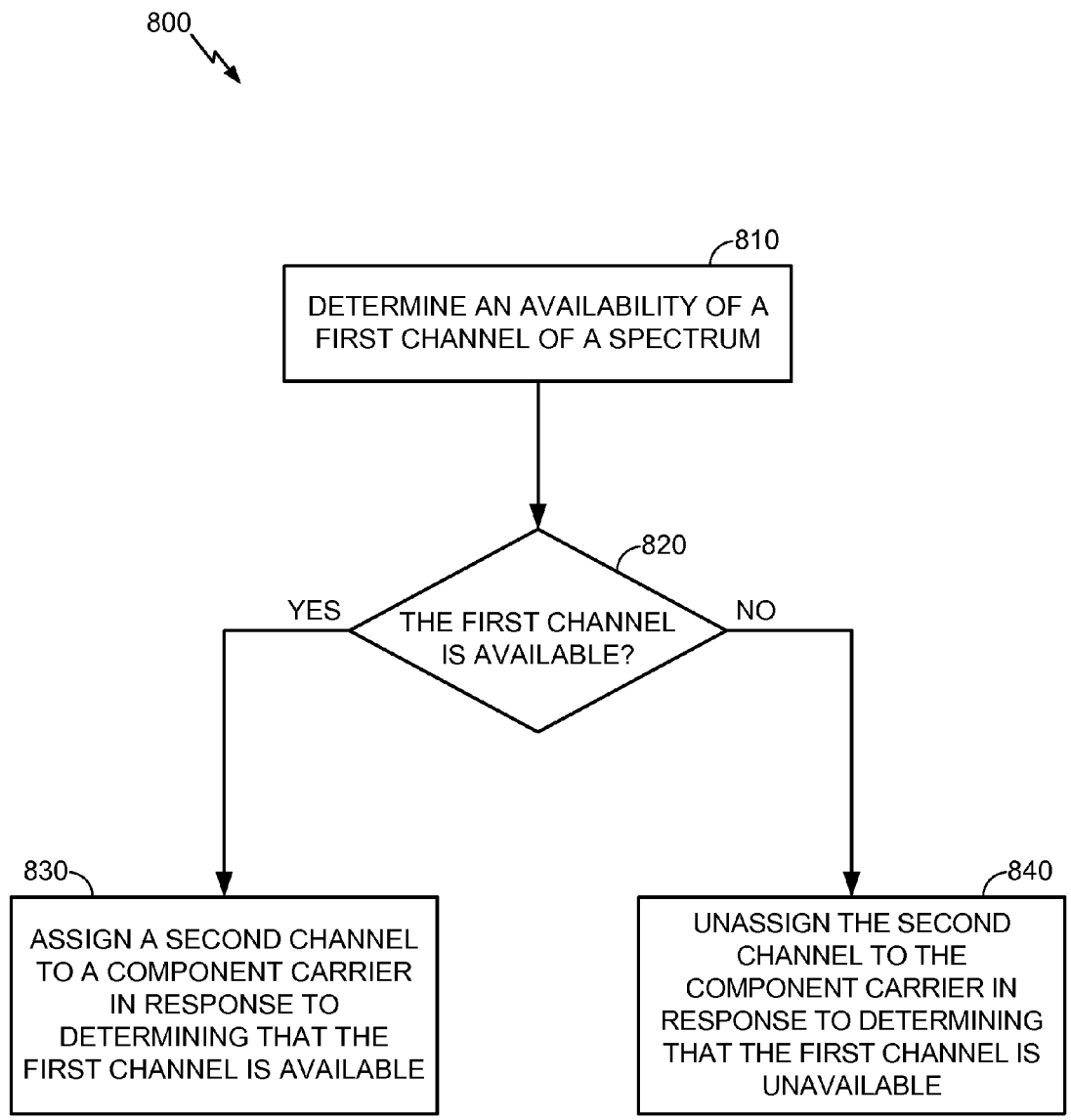
FIG. 8 illustrates aspects of the methodology for ASA CA.

In accordance with one or more aspects of the embodiments described herein, with reference to FIG. 8, there is shown a methodology 800, operable by a network node, such as, for example, a base station, AP, eNodeB, or other network access node. Specifically, method 800 describes ASA CA with sensing, illustrated for example in FIGS. 4A-B and 5. The method 800 may involve, at 810, determining an availability of a first channel of a spectrum. Determining the availability of the first channel may include, for example, monitoring the first channel, detecting transmissions on the first channel, or communicating with one or more mobile entities monitoring the first channel. For example, the method may include receiving from a mobile entity an indication of whether a transmission on the first channel was detected, wherein the assigning the second channel is further based on the received indication. The determining may include, at 820, executing a branching algorithm based (e.g., conditioned) on whether the first channel is available.

The method 800 may involve, at 830, assigning a second channel to a component carrier (e.g., secondary component carrier or other component carrier) in response to determining at 810 and 820 that the first channel is available. Assigning may include, for example, instructing network nodes to use the second channel for the component carrier. The method 800 may involve, at 840, unassigning the second channel to the component carrier (e.g., secondary component carrier or other component carrier) in response to determining that the first channel is unavailable. Unassigning may include, for example, instructing network nodes to stop using the second channel for the component carrier, or specifically to not initiate use of the second channel for the component carrier.

The spectrum may be, or may include, ASA spectrum, and the first channel and second channel may be ASA channels. The first channel and second channel are distinct and separate channels; for example, the first channel may be reserved for uplink by the primary user of the ASA spectrum and the second channel may be reserved for downlink by the primary user, or vice-versa. As in the foregoing example, the first channel and second channel may have a predetermined correlation. For further example, the first channel may be a predetermined channel used for communication by a mobile entity. The method 900 may include additional details as described herein above in connection with FIGS. 4A-B and 5.

Figure 9:
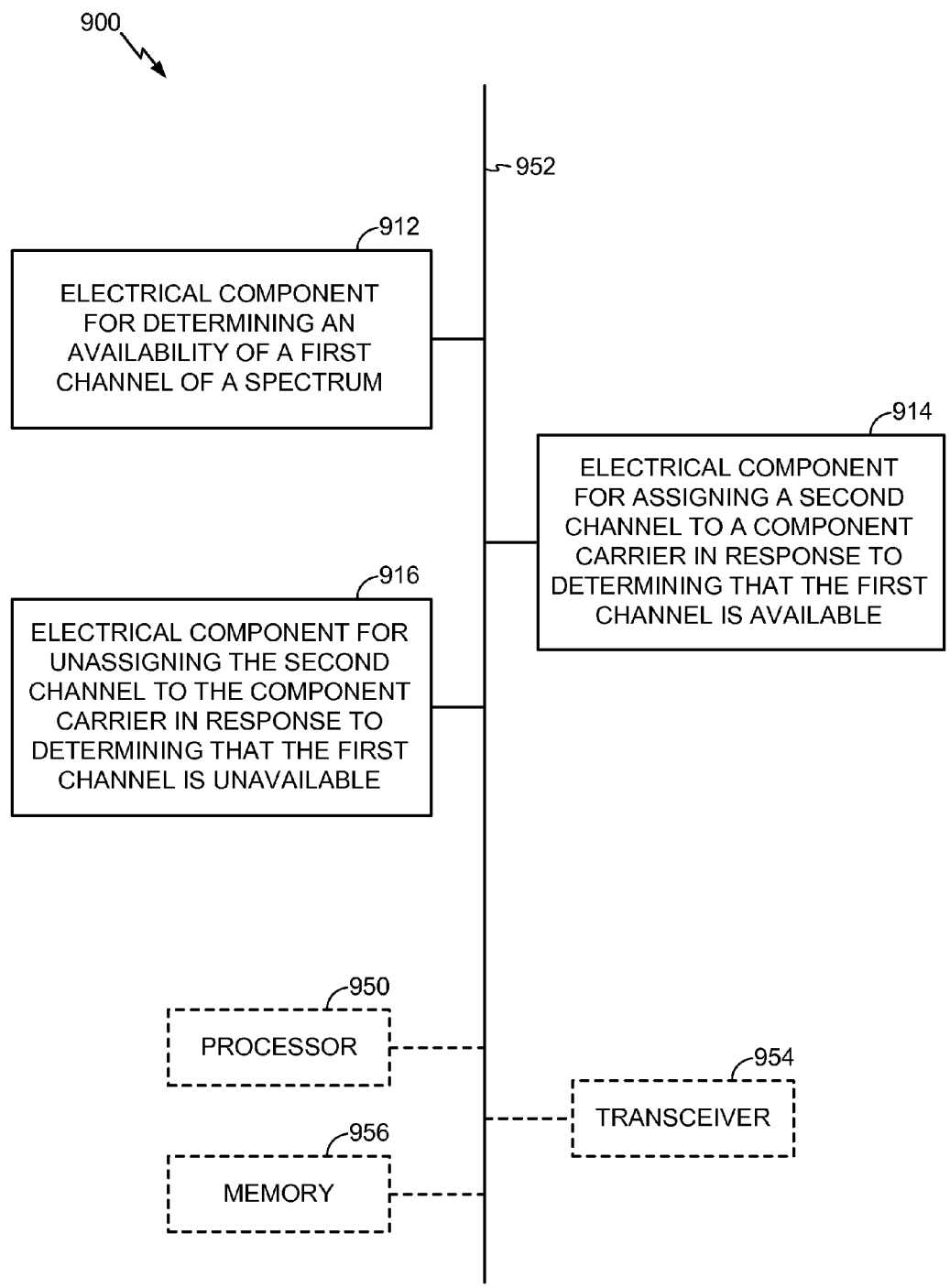
FIG. 9 shows an embodiment of an apparatus for ASA CA, in accordance with the methodology of FIG. 8.

FIG. 9 shows an embodiment of an apparatus for ASA CA with sensing, in accordance with the methodology of FIG. 8. With reference to FIG. 9, there is provided an exemplary apparatus 900 that may be configured as a network node (e.g., base station, AP, eNodeB, or other access node) in a wireless network, or as a processor or similar device/component for use within the network node. The apparatus 900 may include functional blocks that can represent functions implemented by a processor, software, or combination thereof (e.g., firmware). For example, apparatus 900 may include an electrical component or module 912 for determining an availability of a first channel of a spectrum. The component 912 may be, or may include means for determining the availability, said means including an algorithm executed by the processor. The algorithm may include, for example, determining the availability of the channel may include monitoring the channel or receiving from a mobile entity an indication of whether a transmission was detected.

The apparatus 900 may also include a component 914 for assigning a second channel to a secondary carrier in response to determining that the first channel is available. The component 914 may be, or may include means for assigning a second channel to a component carrier (e.g., secondary component carrier or other component carrier) in response to determining that the first channel is available, said means including an algorithm executed by the processor 950. The algorithm may include, for example, a conditional trigger (e.g., IF-THEN function) that executes an assignment function upon an availability parameter changing state from a FALSE (e.g., 0) state to a TRUE (e.g., 1) state. The assignment function may perform one or more operations assigning the second channel (which may be, for example, an ASA channel) to a component carrier (e.g., secondary component carrier or other component carrier) of the network, wherein the operations are selected based on the state of the availability parameter to initiate the assignment. For example, the apparatus may generate one or more messages assigning the second channel to the component carrier, address the messages, and place the messages in a transmission buffer for the apparatus (e.g., in the memory component 956), from whence the apparatus may transmit the message using the transceiver 954 and/or other network interface.

The apparatus 900 may also include a component 916 for unassigning the second channel to the secondary carrier in response to determining that the first channel is unavailable. The component 916 may be, or may include means for unassigning the second channel to the component carrier (e.g., secondary component carrier or other component carrier) in response to determining that the first channel is unavailable, said means including an algorithm executed by the processor 950. The algorithm may include, for example, a conditional trigger (e.g., IF-THEN function) that executes a unassigning function upon an availability parameter changing state from a TRUE (e.g., 1) state to a FALSE (e.g., 0) state. The unassigning function may generate one or more messages informing network nodes that the second channel will no longer be used for the component carrier, address the messages, and place the messages in a transmission buffer for the apparatus (e.g., in the memory component 956), from whence the apparatus may transmit the messages using the transceiver 954 or other network interface.

In related aspects, the apparatus 900 may optionally include a processor component 950 having at least one processor, in the case of the apparatus 900 configured as a network node (e.g., base station, AP, eNodeB, or other access node), rather than as a processor. The processor 950, in such case, may be in operative communication with the components 912-916 via a bus 952 or similar communication coupling. The processor 950 may effect initiation and scheduling of the processes or functions performed by electrical components 912-916.

In further related aspects, the apparatus 900 may include a radio transceiver component 954. A stand alone receiver and/or stand alone transmitter may be used in lieu of or in conjunction with the transceiver 954. When the apparatus 900 is a network node, the apparatus 900 may also include a network interface (not shown) for connecting to one or more core network entities. The apparatus 900 may optionally include a component for storing information, such as, for example, a memory device/component 956. The computer readable medium or the memory component 956 may be operatively coupled to the other components of the apparatus 900 via the bus 952 or the like. The memory component 956 may be adapted to store computer readable instructions and data for effecting the processes and behavior of the components 912-916, and subcomponents thereof, or the processor 950, or the methods disclosed herein. The memory component 956 may retain instructions for executing functions associated with the components 912-916. While shown as being external to the memory 956, it is to be understood that the components 912-916 can exist within the memory 956. It is further noted that the components in FIG. 9 may comprise processors, electronic devices, hardware devices, electronic sub-components, logical circuits, memories, software codes, firmware codes, other electronic components, or any combination thereof.

Figure 10:
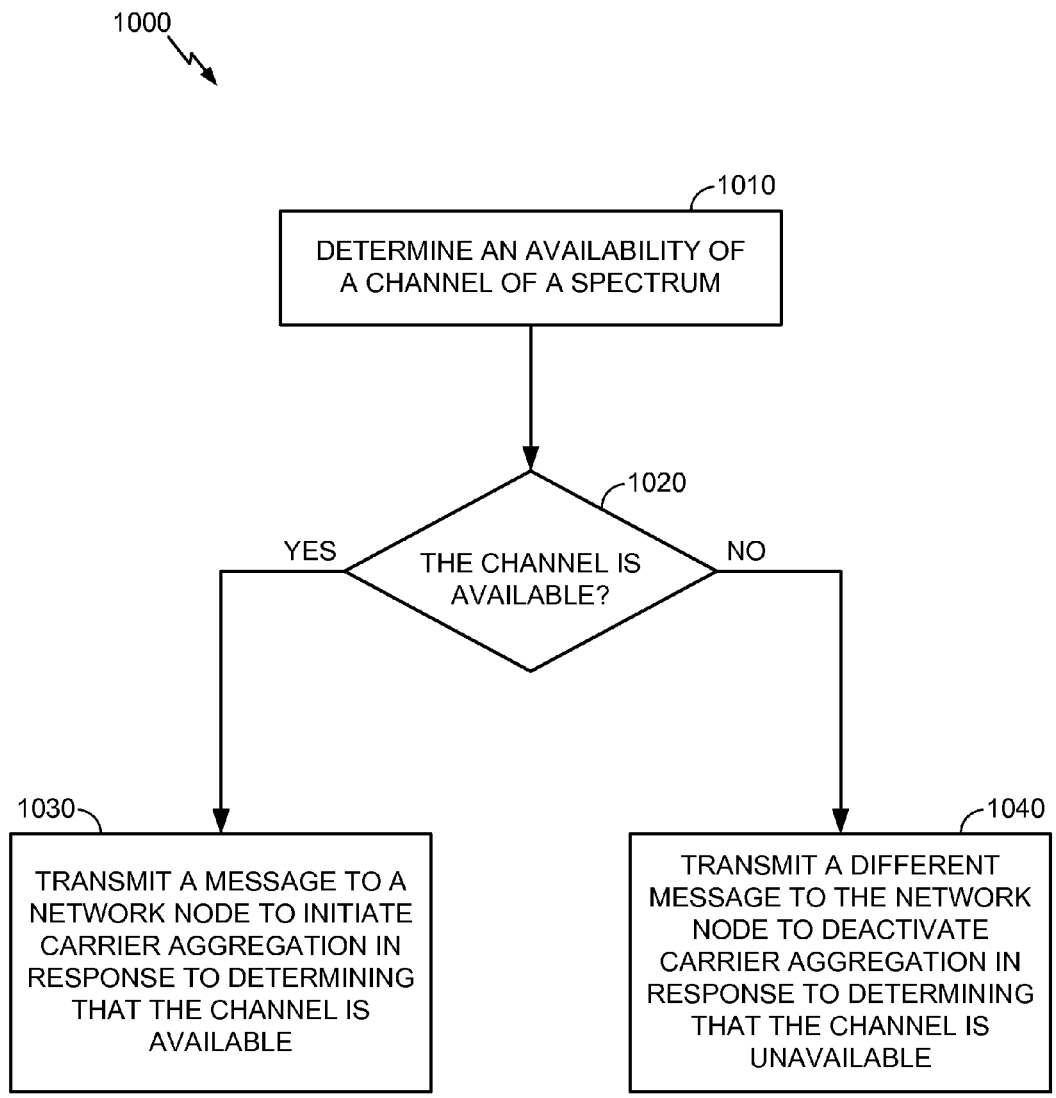
FIG. 10 illustrates aspects of another methodology for ASA CA.

In accordance with one or more aspects of the embodiments described herein, with reference to FIG. 10, there is shown a methodology 1000, operable by a network node, such as, for example, a base station, AP, eNodeB, or other network node. Specifically, method 1000 describes backhaul messaging for ASA CA, illustrated for example in FIG. 6. The method 1000 may involve, at 1010, determining an availability of a channel of a spectrum. For example, determining the availability of the channel may include monitoring the channel or receiving from a mobile entity an indication of whether a transmission was detected. The determining may include, at 1020, executing a branching algorithm based (e.g., conditioned) on whether the channel is available.

The method 1000 may involve, at 1030, transmitting a message to a network node to initiate carrier aggregation in response to determining that the channel is available. As described herein above, the carrier aggregation may be initiated on a different channel than the channel that is determined to be available, based on an inferred correlation between the available channel and the carrier aggregation channel. Activating carrier aggregation may include, for example, initiating use of a component carrier (e.g., secondary component carrier or other component carrier) for carrier aggregation by a secondary user of the ASA spectrum. In such case, the method may include the licensed secondary user transmitting concurrently on a primary component carrier and one or more secondary component carriers (dual path). The licensed secondary user may include at least one base station, for example, an eNB, femtocell, pico cell, or other access node of the wireless communication system, by which the transmitting is carried out. The method 1000 may include additional details described herein above in connection with FIG. 6.

The method 1000 may involve, at 1040, transmitting a different message to the network node to deactivate carrier aggregation in response to determining that the channel is unavailable. The carrier aggregation may be deactivated on a different channel than the channel that is determined to be unavailable, based on an inferred correlation between the unavailable channel and the carrier aggregation channel to be deactivated.

Figure 11:
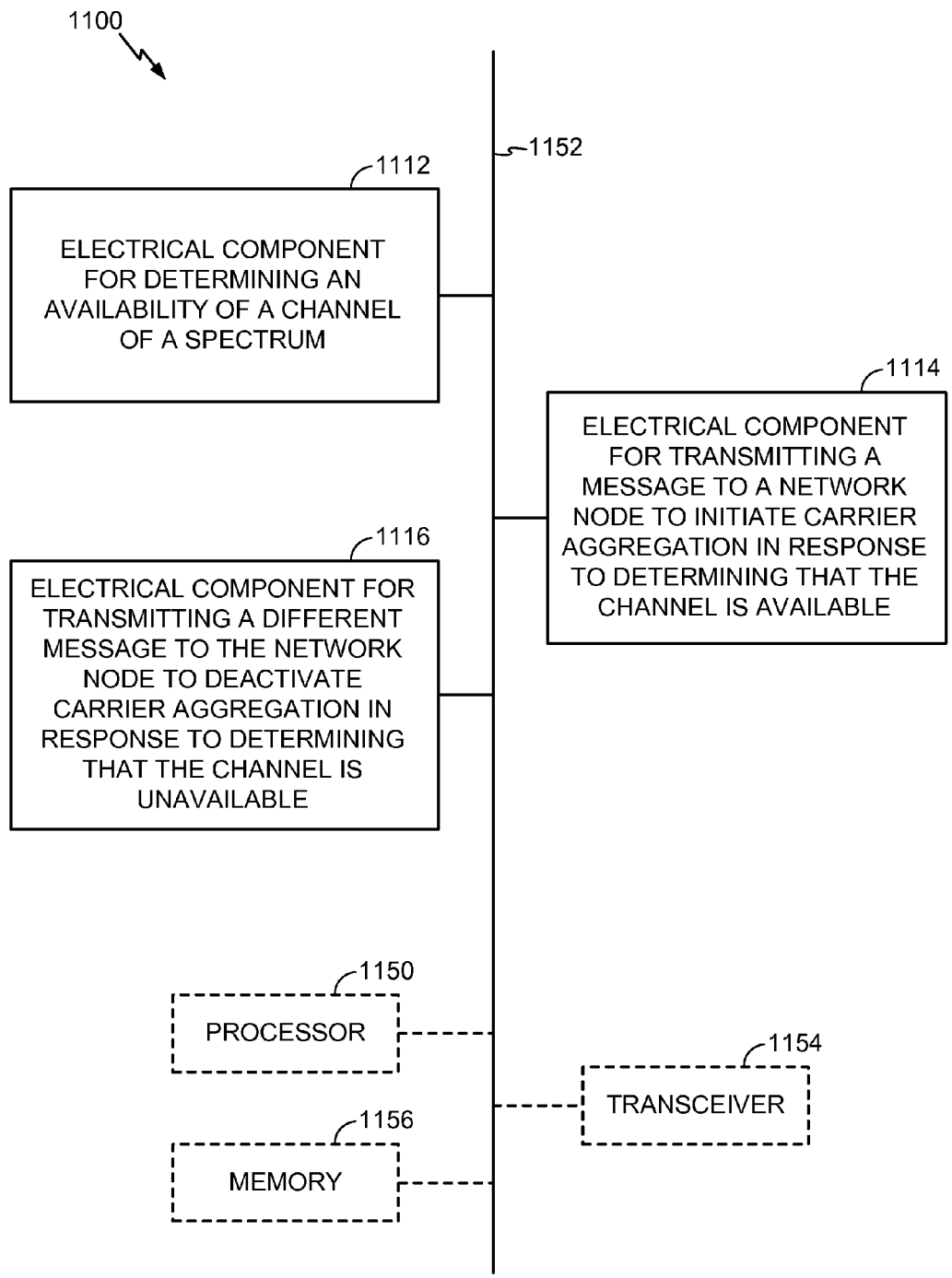
FIG. 11 shows another embodiment of an apparatus for ASA CA, in accordance with the methodology of FIG. 10.

FIG. 11 shows an embodiment of an apparatus for backhaul messaging for ASA CA, in accordance with the methodology of FIG. 10. With reference to FIG. 11, there is provided an exemplary apparatus 1100 that may be configured as a network node (e.g., base station, AP, eNodeB, or other network node) in a wireless network, or as a processor or similar device/component for use within the network node. The apparatus 1100 may include functional blocks that can represent functions implemented by a processor, software, or combination thereof (e.g., firmware). For example, apparatus 1100 may include an electrical component or module 1112 for determining an availability of a channel of a spectrum. The component 1112 may be, or may include means for determining the availability, said means including an algorithm executed by the processor. The algorithm may include, for example, determining the availability of the channel may include monitoring the channel or receiving from a mobile entity an indication of whether a transmission was detected.

The apparatus 1100 may also include a component 1114 for transmitting a message to a network node to initiate carrier aggregation in response to determining that the channel is available. The component 1114 may be, or may include means for transmitting a message to a network node to initiate carrier aggregation in response to determining that the channel is available, said means including an algorithm executed by the processor 1150. The algorithm may include, for example, a conditional trigger (e.g., IF-THEN function) that executes a messaging function upon an availability parameter changing state from a FALSE (e.g., 0) state to a TRUE (e.g., 1) state. The messaging function may generate a message selected based on the state of the availability parameter to initiate carrier aggregation and place the selected message in a transmission buffer for the apparatus (e.g., in the memory component 1156), from whence the apparatus may transmit the message using the transceiver 1154.

The apparatus 1100 may also include a component 1116 for transmitting a different message to the network node to deactivate carrier aggregation in response to determining that the channel is unavailable. The component 1116 may be, or may include means for transmitting a different message to the network node to deactivate carrier aggregation in response to determining that the channel is unavailable, said means including an algorithm executed by the processor 1150. The algorithm may include, for example, a conditional trigger (e.g., IF-THEN function) that executes a messaging function upon an availability parameter changing state from a TRUE (e.g., 1) state to a FALSE (e.g., 0) state. The messaging function may generate an appropriate message selected based on the current state of the availability parameter to deactivate carrier aggregation, and place the selected message in a transmission buffer for the apparatus (e.g., in the memory component 1156), from whence the apparatus may transmit the message using the transceiver 1154.

In related aspects, the apparatus 1100 may optionally include a processor component 1150 having at least one processor, in the case of the apparatus 1100 configured as a network node (e.g., base station, AP, eNodeB, or other network entity), rather than as a processor. The processor 1150, in such case, may be in operative communication with the components 1112-1116 via a bus 1152 or similar communication coupling. The processor 1150 may effect initiation and scheduling of the processes or functions performed by electrical components 1112-1116.

In further related aspects, the apparatus 1100 may include a radio transceiver component 1154. A stand-alone receiver and/or stand-alone transmitter may be used in lieu of or in conjunction with the transceiver 1154. When the apparatus 1100 is a network node, the apparatus 1100 may also include a network interface (not shown) for connecting to one or more core network entities. The apparatus 1100 may optionally include a component for storing information, such as, for example, a memory device/component 1156. The computer readable medium or the memory component 1156 may be operatively coupled to the other components of the apparatus 1100 via the bus 1152 or the like. The memory component 1156 may be adapted to store computer readable instructions and data for effecting the processes and behavior of the components 1112-1116, and subcomponents thereof, or the processor 1150, or the methods disclosed herein. The memory component 1156 may retain instructions for executing functions associated with the components 1112-1116. While shown as being external to the memory 1156, it is to be understood that the components 1112-1116 can exist within the memory 1156. It is further noted that the components in FIG. 11 may comprise processors, electronic devices, hardware devices, electronic sub-components, logical circuits, memories, software codes, firmware codes, other electronic components, or any combination thereof.

Figure 12:
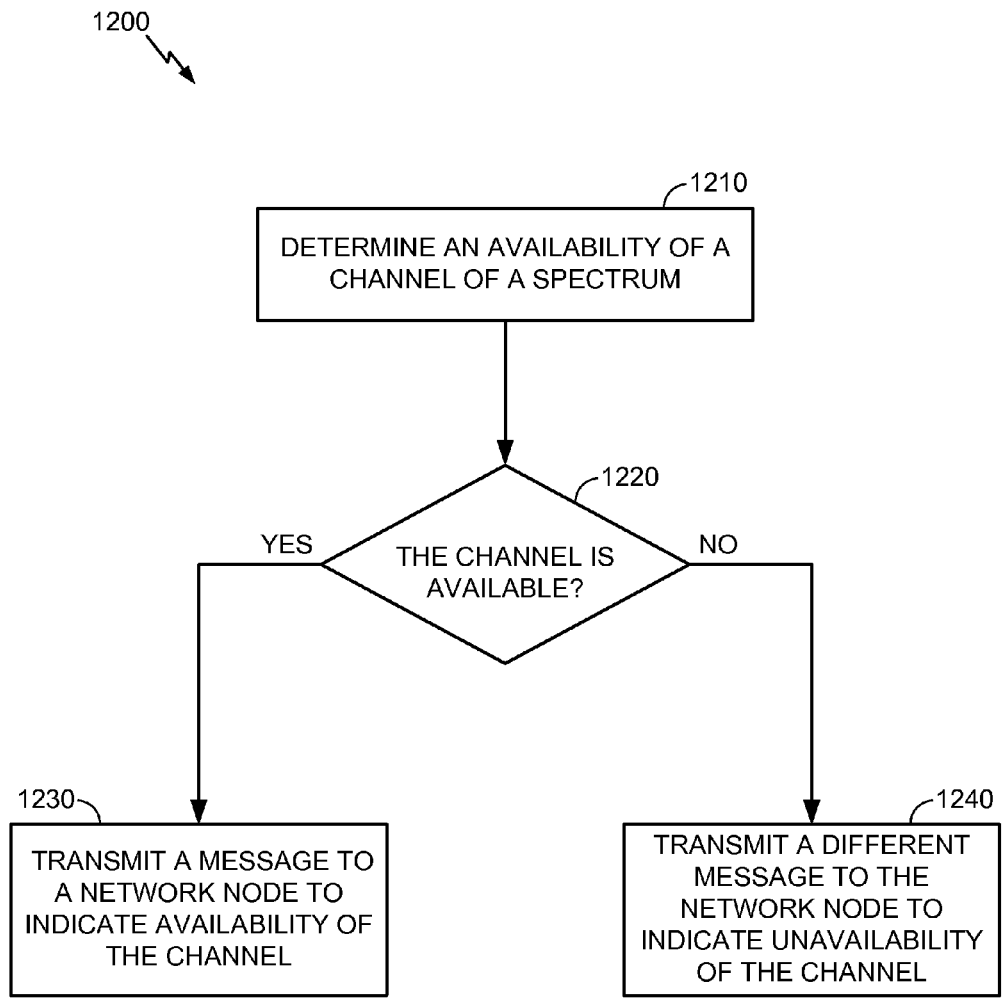
FIG. 12 illustrates aspects of another methodology for ASA CA.

In accordance with one or more aspects of the embodiments described herein, with reference to FIG. 12, there is shown a methodology 1200, operable by a network node, such as, for example, a base station, AP, eNodeB, or other network entity. Specifically, method 1200 describes coordinated sensing for ASA CA, illustrated for example in FIG. 7, and may include addition details as described above in connection with FIG. 7. The method 1200 may involve, at 1210, determining an availability of a channel of a spectrum. For example, determining the availability of the channel may include monitoring the channel or receiving from a mobile entity an indication of whether a transmission was detected. The method 1200 may involve, at 1220, checking whether the channel is available. The method 1200 may involve, at 1230, transmitting a message to a network node to indicate availability of the channel in response to determining that the channel is available. The method 1200 may involve, at 1240, transmitting a different message to the network node to indicate unavailability of the channel in response to determining that the channel is unavailable.

Figure 13:
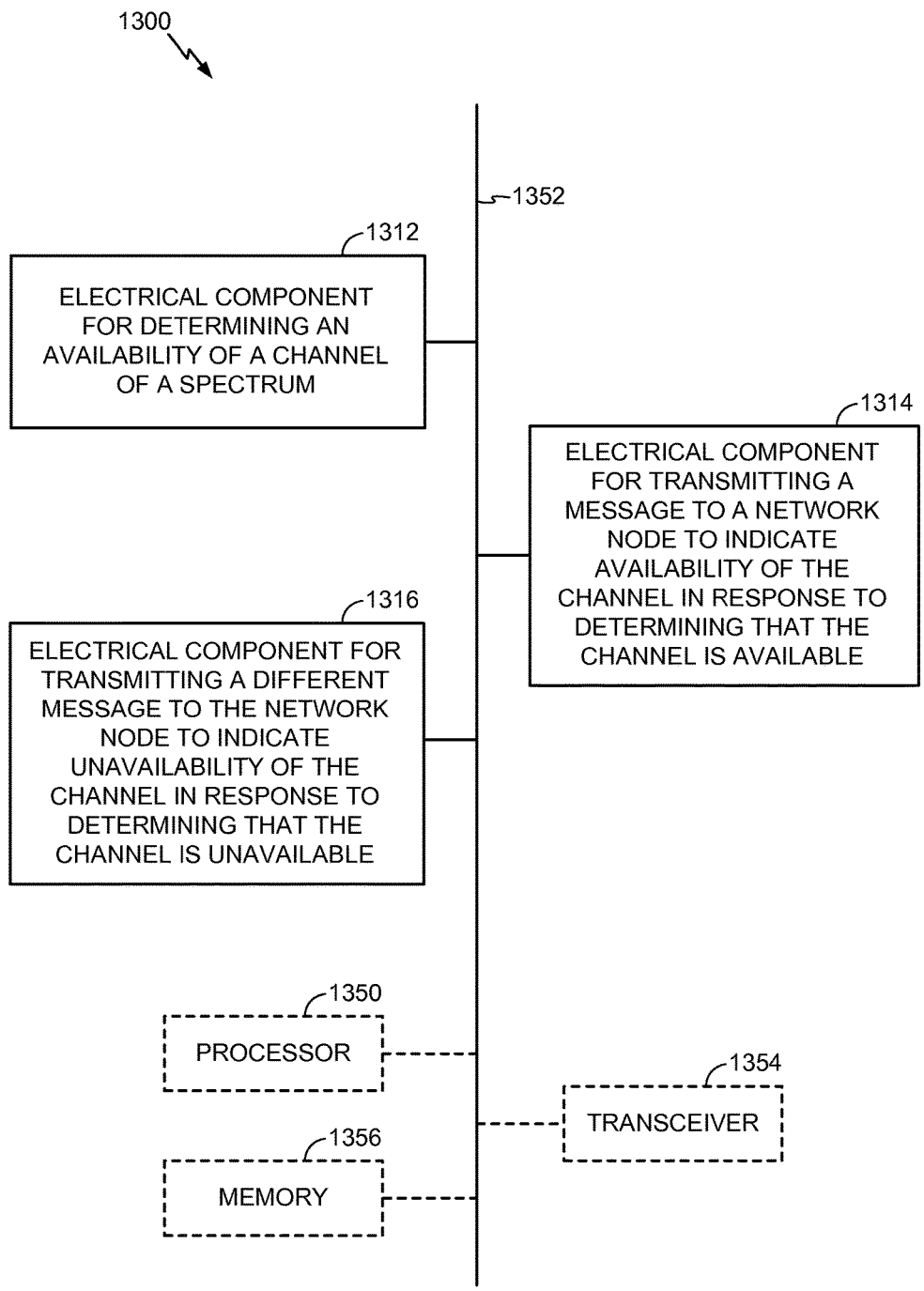
FIG. 13 shows yet another embodiment of an apparatus for ASA CA, in accordance with the methodology of FIG. 12.

FIG. 13 shows an embodiment of an apparatus for coordinated sensing for ASA CA, in accordance with the methodology of FIG. 12. With reference to FIG. 13, there is provided an exemplary apparatus 1300 that may be configured as a network node (e.g., base station, AP, eNodeB, or other network entity) in a wireless network, or as a processor or similar device/component for use within the network node. The apparatus 1300 may include functional blocks that can represent functions implemented by a processor, software, or combination thereof (e.g., firmware). For example, apparatus 1300 may include an electrical component or module 1312 for determining an availability of a channel of a spectrum. The component 1312 may be, or may include means for determining the availability, said means including an algorithm executed by the processor. The algorithm may include, for example, determining the availability of the channel may include monitoring the channel or receiving from a mobile entity an indication of whether a transmission was detected.

The apparatus 1300 may also include a component 1314 for transmitting a message to a network node to indicate availability of the channel in response to determining that the channel is available. The component 1314 may be, or may include means for transmitting a message to a network node to indicate availability of the channel in response to determining that the channel is available, said means including an algorithm executed by the processor 1350. The algorithm may include, for example, a conditional trigger (e.g., IF-THEN function) that executes a messaging function upon an availability parameter changing state from a FALSE (e.g., 0) state to a TRUE (e.g., 1) state. The messaging function may generate an appropriate message selected based on the state of the availability parameter and place the selected message in a transmission buffer for the apparatus (e.g., in the memory component 1356), from whence the apparatus may transmit the message using the transceiver 1354.

The apparatus 1300 may also include a component 1316 for transmitting a different message to the network node to indicate unavailability of the channel in response to determining that the channel is unavailable. The component 1316 may be, or may include means for transmitting a different message to the network node to indicate unavailability of the channel in response to determining that the channel is unavailable, said means including an algorithm executed by the processor 1350. The algorithm may include, for example, a conditional trigger (e.g., IF-THEN function) that executes a messaging function upon an availability parameter changing state from a TRUE (e.g., 1) state to a FALSE (e.g., 0) state. The messaging function may generate an appropriate message selected based on the current state of the availability parameter and place the selected message in a transmission buffer for the apparatus (e.g., in the memory component 1356), from whence the apparatus may transmit the message using the transceiver 1354. The message transmitted by the component 1316 should be different from the message transmitted by the other component 1314.

In related aspects, the apparatus 1300 may optionally include a processor component 1350 having at least one processor, in the case of the apparatus 1300 configured as a network node (e.g., base station, AP, eNodeB, or other access node), rather than as a processor. The processor 1350, in such case, may be in operative communication with the components 1312-1316 via a bus 1352 or similar communication coupling. The processor 1350 may effect initiation and scheduling of the processes or functions performed by electrical components 1312-1316.

In further related aspects, the apparatus 1300 may include a radio transceiver component 1354. A stand-alone receiver and/or stand-alone transmitter may be used in lieu of or in conjunction with the transceiver 1354. When the apparatus 1300 is a network node, the apparatus 1300 may also include a network interface (not shown) for connecting to one or more core network entities. The apparatus 1300 may optionally include a component for storing information, such as, for example, a memory device/component 1356. The computer readable medium or the memory component 1356 may be operatively coupled to the other components of the apparatus 1300 via the bus 1352 or the like. The memory component 1356 may be adapted to store computer readable instructions and data for effecting the processes and behavior of the components 1312-1316, and subcomponents thereof, or the processor 1350, or the methods disclosed herein. The memory component 1356 may retain instructions for executing functions associated with the components 1312-1316. While shown as being external to the memory 1356, it is to be understood that the components 1312-1316 can exist within the memory 1356. It is further noted that the components in FIG. 13 may comprise processors, electronic devices, hardware devices, electronic sub-components, logical circuits, memories, software codes, firmware codes, other electronic components, or any combination thereof.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Non-transitory computer-readable media includes at least computer or memory storage media. A storage or memory media may be any available non-transitory media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and blu-ray disc where disks usually encode data magnetically, while discs encode data optically. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for managing authorized shared access (ASA) spectrum resources in a wireless communication system to reduce interference, the method comprising:
receiving a sensing result from a user equipment (UE), wherein the ASA spectrum comprises a first channel and a second channel;
determining, based on receiving the sensing result, an availability of the first channel for use,
wherein the first channel is an intended candidate for use,
wherein the second channel is not an intended candidate for use,
wherein a use of the second channel indicates the availability of the first channel, and
wherein, when the sensing result indicates that the first channel is busy with activity, the first channel is determined to be unavailable; and
propagating an ASA indicator message indicating the availability of the first channel,
wherein the ASA indicator message is propagated via neighbor nodes via a backhaul protocol,
wherein the backhaul protocol comprises at least one of an X2 protocol or an Iu protocol, and
wherein, upon a node receiving the ASA indicator message from one of the neighbor nodes, the node performs one of:
assigning the first channel to at least one of a primary component carrier (PCC) or a secondary component carrier (SCC) when the first channel is available, or
unassigning the first channel to at least one of the PCC or the SCC when at least one of the first channel or the second channel is unavailable.

2. The method of claim 1, further compromising at least one of:
activating the PCC or the SCC when the availability of the first channel indicates that the first channel is available, or
deactivating the PCC or the SCC when the availability of the first channel indicates that the first channel is unavailable.

3. The method of claim 1,
wherein the method further comprises:
transmitting simultaneously on the PCC and the SCC.

4. The method of claim 1, wherein the first channel and the second channel have a predetermined usage correlation that indicates the availability of the first channel based on availability of the second channel.

5. The method of claim 1,
wherein the second channel is an uplink channel, and
wherein the first channel is a downlink channel.

6. The method of claim 1, wherein the first channel is a channel used for communication by a mobile entity.

7. The method of claim 1, wherein the availability of the first channel indicates that the first channel is available when transmissions are detected on the first channel.

8. The method of claim 1, wherein the first channel and the second channel are ASA channels.

9. An apparatus for managing authorized shared access (ASA) spectrum resources in a wireless communication system to reduce interference, the apparatus comprising:
at least one processor configured to:
receive a sensing result from a user equipment (UE), wherein the ASA spectrum comprises a first channel and a second channel,
determine, based on receiving the sensing result, an availability of the first channel for use,
wherein the first channel is an intended candidate for use,
wherein the second channel is not an intended candidate for use,
wherein a use of the second channel indicates the availability of the first channel, and
wherein, when the sensing result indicates that the first channel is busy with activity, the first channel is determined to be unavailable, and
propagate an ASA indicator message indicating the availability of the first channel,
wherein the ASA indicator message is propagated via neighbor nodes via a backhaul protocol,
wherein the backhaul protocol comprises at least one of an X2 protocol or an Iu protocol, and
wherein, upon a node receiving the ASA indicator message from one of the neighbor nodes, the node performs one of:

assigning the first channel to at least one of a primary component carrier (PCC) or a secondary component carrier (SCC) when the first channel is available, or unassigning the first channel to at least one of the PCC or the SCC when at least one of the first channel or the second channel is unavailable; and a memory coupled to the at least one processor for storing data.

10. The apparatus of claim 9, wherein the at least one processor is further configured to:

activate the PCC or the SCC when the availability of the first channel indicates that the first channel is available, or deactivate the PCC or the SCC when the availability of the first channel indicates that the first channel is unavailable.

11. The apparatus of claim 9, wherein the at least one processor is further configured to:

transmit simultaneously on the PCC and the SCC.

12. The apparatus of claim 9,
wherein the first channel is a downlink channel, and
wherein the second channel is an uplink channel.

13. The apparatus of claim 9, wherein the first channel and the second channel have a predetermined usage correlation that indicates the availability of the first channel based on availability of the second channel.

14. The apparatus of claim 9, wherein the availability of the first channel indicates that the first channel is available when transmissions are detected on the first channel.

15. The apparatus of claim 9, wherein the first channel and the second channel are ASA channels.

16. An apparatus for managing authorized shared access (ASA) spectrum resources in a wireless communication system to reduce interference, the apparatus comprising:

means for receiving a sensing result from a user equipment (UE),
wherein the ASA spectrum comprises a first channel and a second channel;

means for determining, based on receiving the sensing result, an availability of the first channel of a spectrum is available for use,
wherein the first channel is an intended candidate for use,
wherein the second channel is not an intended candidate for use,
wherein a use of the second channel indicates the availability of the first channel, and
wherein, when the sensing result indicates that the first channel is busy with activity, the first channel is determined to be unavailable; and means for propagating an ASA indicator message indicating the availability of the first channel,
wherein the ASA indicator message is propagated via neighbor nodes via a backhaul protocol,
wherein the backhaul protocol comprises at least one of an X2 protocol or an Iu protocol, and
wherein, upon a node receiving the ASA indicator message from one of the neighbor nodes, the node performs one of:
assigning the first channel to at least one of a primary component carrier (PCC) or a secondary component carrier (SCC) when the first channel is available, or
unassigning the first channel to at least one of the PCC or the SCC when at least one of the first channel or the second channel is unavailable.

17. The apparatus of claim 16, further comprising:
means for activating the PCC or the SCC when the availability of the first channel indicates that the first channel is available, or
means for deactivating the PCC or the SCC when the availability of the first channel indicates that the first channel is unavailable.

18. The apparatus of claim 16, further comprising:
means for transmitting simultaneously on the PCC and the SCC.

19. The apparatus of claim 16,
wherein the first channel is a downlink channel, and
wherein the second channel is an uplink channel.

20. The apparatus of claim 16, wherein the first channel and the second channel have a predetermined usage correlation that indicates the availability of the first channel based on availability of the second channel.

21. The apparatus of claim 16, wherein the availability of the first channel indicates that the first channel is available when transmissions are detected on the first channel.

22. The apparatus of claim 16, wherein the first channel and the second channel are ASA channels.

23. A non-transitory computer-readable medium storing instructions for managing authorized shared access (ASA) spectrum resources in a wireless communication system to reduce interference, the instructions comprising:

one or more instructions that, when executed by at least one computer, cause the at least one computer to:
receive a sensing result from a user equipment (UE),
wherein the ASA spectrum comprises a first channel and a second channel;
determine, based on receiving the sensing result, an availability of the first channel for use,
wherein the first channel is an intended candidate for use,
wherein the second channel is not an intended candidate for use,
wherein a use of the second channel indicates the availability of the first channel, and
wherein, when the sensing result indicates that the first channel is busy with activity, the first channel is determined to be unavailable; and
propagate an ASA indicator message indicating the availability of the first channel,
wherein the ASA indicator message is propagated via neighbor nodes via a backhaul protocol,
wherein the backhaul protocol comprises at least one of an X2 protocol or an Iu protocol, and
wherein, upon a node receiving the ASA indicator message from one of the neighbor nodes, the node performs one of:
assigning the first channel to at least one of a primary component carrier (PCC) or a secondary component carrier (SCC) when the first channel is available,
unassigning the first channel to at least one of the PCC or the SCC when at least one of the first channel or the second channel is unavailable.

24. The non-transitory computer-readable medium of claim 23, wherein the instructions further comprise:
one or more instructions that, when executed by the at least one computer, cause the at least one computer to:

activate the PCC or the SCC when the availability of the first channel indicates that the first channel is available, or deactivate the PCC or the SCC when the availability of the first channel indicates that the first channel is unavailable.

25. The non-transitory computer-readable medium of claim 23, wherein the instructions further comprise:
one or more instructions that, when executed by the at least one computer, cause the at least one computer to:
transmit simultaneously on the PCC and the SCC.

26. The non-transitory computer-readable medium of claim 23,
wherein the first channel is a downlink channel, and
wherein the second channel is an uplink channel.

27. The non-transitory computer-readable medium of claim 23, wherein the first channel and the second channel have a predetermined usage correlation that indicates the availability of the first channel based on availability of the second channel.

28. The non-transitory computer-readable medium of claim 23, wherein the availability of the first channel indicates that the first channel is available when transmissions are detected on the first channel.

29. The non-transitory computer-readable medium of claim 23, wherein the first channel and the second channel are ASA channels.

\* \* \* \* \*